United States Patent [19]

Van Nostrand

[11] Patent Number: 4,678,294

[45] Date of Patent: Jul. 7, 1987

[54] MIRROR ASSEMBLY FOR DETERMINING DISTANCE TO PASSED VEHICLE

[76] Inventor: Willard R. Van Nostrand, 3737 Calle Cortez, Tucson, Ariz. 85716

[21] Appl. No.: 804,173

[22] Filed: Dec. 3, 1985

[51] Int. Cl.⁴ ............................................... G02B 5/08
[52] U.S. Cl. ..................................... 350/611; 350/612; 248/483
[58] Field of Search .............. 350/600, 604, 605, 612, 350/616, 623, 624, 626, 627; 248/466, 479, 483; 356/3, 5, 8, 18, 72

[56] References Cited

U.S. PATENT DOCUMENTS

| | | | |
|---|---|---|---|
| 1,311,253 | 7/1919 | Stern | 350/600 X |
| 1,879,592 | 9/1932 | Thomas | 350/600 X |
| 2,605,676 | 8/1952 | Couch . | |
| 2,649,028 | 8/1953 | Lenta . | |
| 3,021,756 | 2/1962 | Milton et al. . | |
| 3,104,274 | 9/1963 | King | 248/179 X |
| 3,375,053 | 3/1968 | Ward . | |
| 3,480,350 | 11/1969 | Hamby . | |
| 3,501,227 | 3/1970 | Landen | 350/627 |
| 3,644,021 | 2/1972 | Hamby | 350/627 X |
| 3,712,715 | 1/1973 | Wagner . | |
| 3,826,563 | 7/1974 | Davis | 350/627 X |
| 4,023,029 | 5/1977 | Fischer | 350/600 X |
| 4,157,862 | 6/1979 | Jackson | 350/627 |
| 4,182,552 | 1/1980 | Feinbloom | 350/600 |
| 4,293,191 | 10/1981 | Kim . | |

FOREIGN PATENT DOCUMENTS

| | | | |
|---|---|---|---|
| 1146388 | 3/1963 | Fed. Rep. of Germany | 350/627 |
| 3411082 | 11/1984 | Fed. Rep. of Germany | 350/600 |

Primary Examiner—Donald Watkins
Attorney, Agent, or Firm—Cahill, Sutton & Thomas

[57] ABSTRACT

A mirror assembly for attachment to a vehicle such as a motorhome or semi-truck includes a first mirror plane adjusted to bring the distant rearward right highway lane into view of the driver, a second mirror plane adjusted downward and outward to bring to the driver's eye a view of only 50 feet of rearward right lane, and a bugeye mirror for bringing to the driver's eye a view of an immediately adjacent vehicle being passed. When the driver of the passing vehicle has passed the other vehicle, he knows it is safe to pull back into the right lane, ahead of the passed vehicle, when the images of both headlights of the passed vehicle come into a predetermined relationship with the second plane mirror.

10 Claims, 8 Drawing Figures

MIRROR ASSEMBLY FOR DETERMINING DISTANCE TO PASSED VEHICLE

BACKGROUND OF THE INVENTION

The invention relates to mirror assemblies for attachment to motor vehicles, and more particularly to multiple mirror assemblies that determine when it is safe for a passing vehicle to pull from a passing lane into the driving lane ahead of a passed vehicle.

A problem continually faced by persons who drive large vehicles, such as motorhomes pulling trailers or large trucks pulling trailers, is that when such persons attempt to pass a slower vehicle, they have considerable difficulty in judging when the passing vehicle has completely passed the other vehicle and when it it safe to pull back into the right-hand lane ahead of the passed vehicle. Conventional outside rearview mirrors located on the passenger side of the vehicle ordinarily are aimed so that they bring into the view of the driver the distant highway behind the vehicle. Such conventional outside rearview mirrors only reflect the image of the vehicle being passed to the eye of the driver of the passing vehicle if the passed vehicle is more than about 80 to 100 feet behind such mirrors. It is very difficult even for a skilled driver of a truck or motorhome, especially one pulling a long trailer, to judge the distance from the rear end of his trailer to the front end of the vehicle being passed. The fact that large vehicles generally accelerate slowly and take quite a long time to safely pass a slower vehicle, especially on a slight grade, and in view of the fact that it is difficult for a driver to simultaneously judge the approach speed of distant oncoming vehicles, often makes passing of a slower vehicle a needlessly risky undertaking.

Although there are quite a variety of known vehicle mirrors, none are adapted to providing a clear indication of when it is safe for a passing vehicle to pull into the lane in front a vehicle being passed. For example, U.S. Pat. No. 3,480,350 discloses a mirror assembly attached outside of the driver's window of a vehicle. This mirror includes three plane mirrors within a unitary frame, two of which are adjustable independently of the third. The teaching of this reference is to provide a rear vision mirror assembly that is capable of providing rearward views of substantially the entire roadway behind the associated vehicle, i.e., the vehicle to which the mirror assembly is attached. No teaching is provided as to judging the distance from the rear end of the associated vehicle to the front end of a following vehicle. U.S. Pat. No. 3,712,715 discloses a similar mirror assembly including three mirrors mounted on a common support structure to give full rear vision coverage of the sides of the associated vehicle. The foregoing references, and also U.S. Pat. Nos. 3,644,021; 2,605,676 2,649,028; 3,021,756; 3,104,274; 3,375,053; and 4,293,191 are deemed to be generally illustrative of the state-of-the-art of vehicle rearview mirrors.

SUMMARY OF THE INVENTION

Accordingly, it is an object of the invention to provide a rearview mirror assembly that enables a driver of a passing vehicle in a "passing" lane of a highway to easily and accurately determine when it is sufficiently far ahead of a vehicle being passed to safely pull into the "driving" lane ahead of the passed vehicle.

It is another object of the invention to provide a practical rearview mirror assembly that enables a driver of a vehicle to easily and accurately determine when another vehicle or an object is a predetermined distance behind the vehicle.

Briefly described, and in accordance with one embodiment thereof, the invention provides a rearview mirror assembly including a first mirror plane attached to a passing vehicle and aimed to bring a view of the distant rearward highway to the eye of the driver, and also including a second mirror plane located adjacent to the first and aimed to bring to the driver's eye a view of a section of close rearward highway extending backward only to a predetermined distance behind the passing vehicle to which the rearview mirror assembly is attached, so that reflected images of the headlights of a vehicle being passed, as seen by the driver of the passing vehicle, do not move into a predetermined relationship to the second mirror plane until it is safe for the passing vehicle to pull into the lane ahead of the passed vehicle. In the described embodiment of the invention, indicia are provided in diagonally opposite corners of the first and second mirrors, respectively. In order to align the first and second mirrors, an alignment marker having the same elevation as an automobile headlight, or an automobile is positioned a safe "pull-in" distance behind the vehicle to which the rearview mirror assembly is attached. The first and second mirror planes are adjusted so that their alignment indicia coincide with the image of the alignment marker or the left headlight of the positioned automobile. Typically, the first and second plane mirrors are aligned so that their respective alignment indicia are superimposed on the reflected image of the alignment marker or the left headlight of the positioned automobile, as seen by the driver of the passing vehicle to which the mirrors are attached, when the alignment marker or headlight is approximately 50 feet behind the rear end of the passing vehicle including any trailer towed thereby. In the described embodiment of the invention, the driver's seat is on the left-hand side of the vehicle, and the rearview mirror assembly is mounted outside the right door of the passenger compartment of the vehicle. The alignment indicia of the first mirror is located in the lower right-hand corner thereof, and the alignment indicia of the second plane mirror is located in the upper left-hand corner thereof. In the described embodiment of the invention, a semi-spherical bugeye mirror is attached to the lower left corner of the first mirror to provide the driver with a view of an along-side vehicle in the driver's "blind spot".

DESCRIPTION OF THE INVENTION

Figure 1:
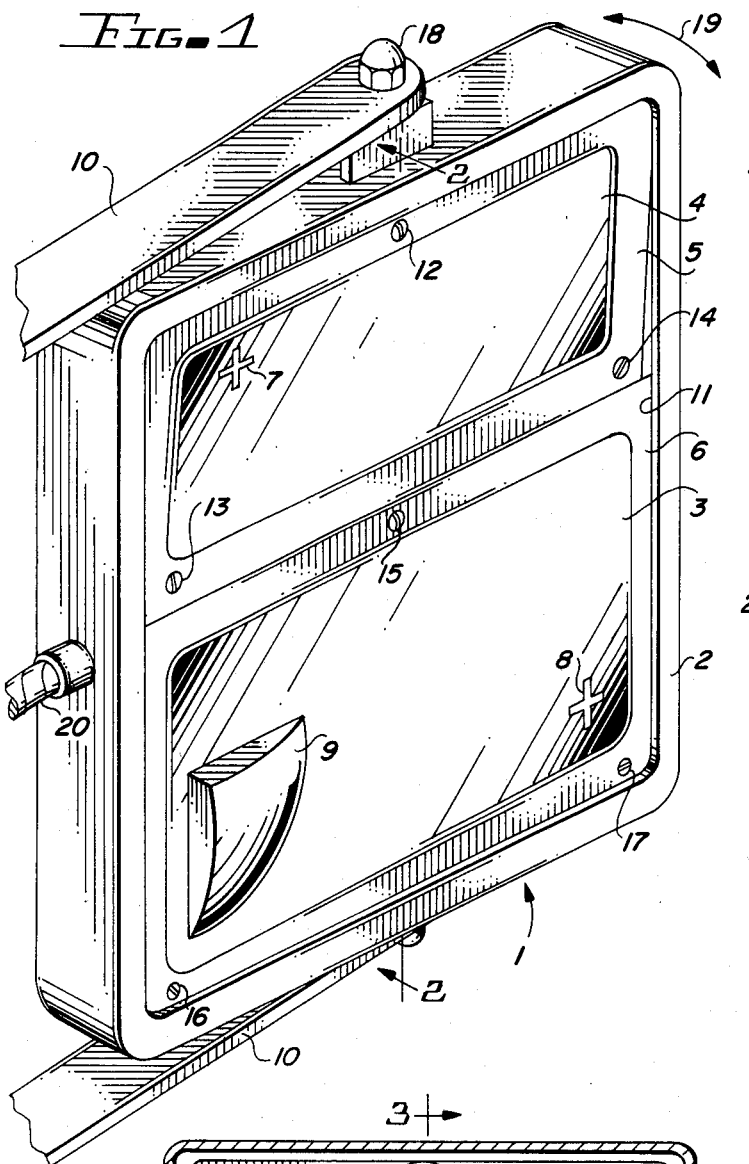
FIG. 1 is a perspective view of the rearview mirror assembly of the present invention.
Figure 3:
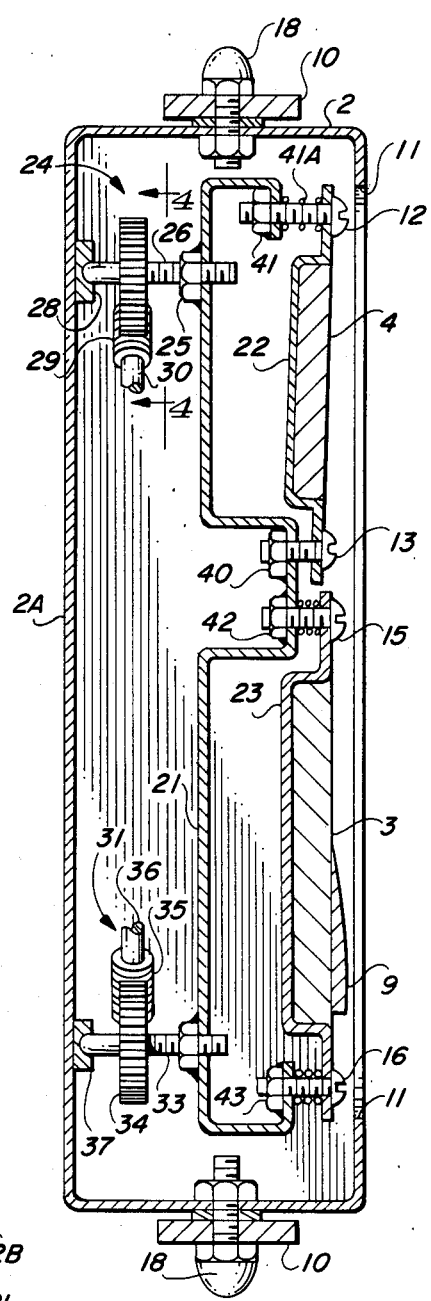
FIG. 3 is a section view taken along section line 3—3 of FIG. 2.
Figure 2:
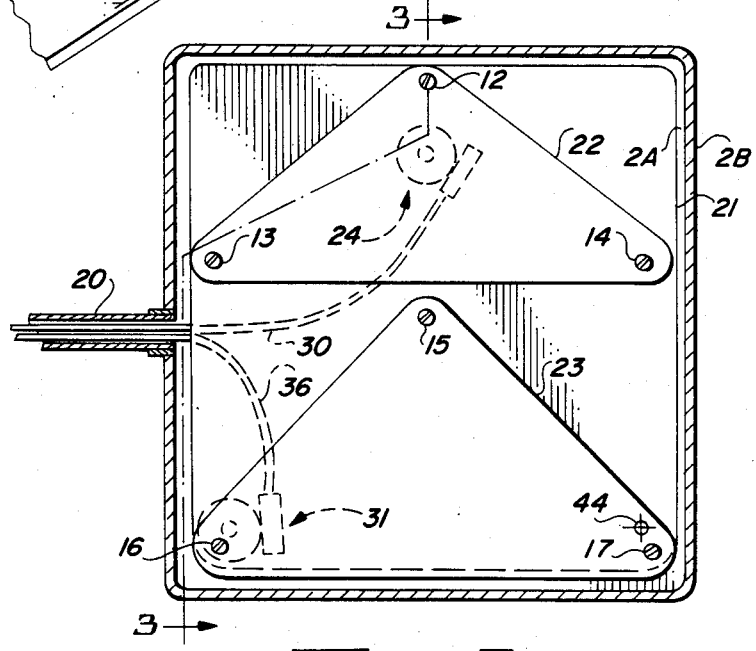
FIG. 2 is a section view along section line 2—2 of FIG. 1.

Referring now to the drawings, particularly FIGS. 1-3, mirror assembly 1 includes a unitary frame or housing 2 having a solid back wall 2A and a large rectangular aperture 11 in its front wall. Frame 2 is supported about a vertical axis by means of two frame members 10. Pivot connectors 18 permit the frame 2 of mirror assembly 1 to be pivoted about its vertical axis in the directions indicated by arrows 19 and tightened in a selected position.

A lower mirror 3 (referred to herein as a "standard mirror 3") and an upper mirror 4 (referred to herein as a "blind side mirror 4") are supported within frame or housing 2 by a lower mirror hanger assembly 23 and an upper mirror hanger assembly 22, respectively, as best seen in FIG. 3. Mirror hanger assemblies 22 and 23 are both supported by an adjustable support 21.

Adjustable support 21 is connected at three points to the back inner surface of back wall 2A. As best seen in FIG. 2, adjustable support 21 has its lower right corner pivotally connected by pivot connector 44 to the back wall 2A. An adjustable spacer assembly 31 connects the lower left corner of adjustable support 21 to the inner surface of back wall 2A. The upper portion of adjustable support 21 is connected by an adjustable spacer assembly 24 to the inner surface of back wall 2A. Adjustable spacer assemblies 24 and 31 adjust the spacing of two of the three support points of adjustable support 21 to back wall 2A. This triangular support arrangement allows adjustable support 21 to be precisely adjusted in any direction within the adjustment limits of adjustment mechanisms 24 and 31. The adjustable support 21 supports upper mirror hanger assembly 22 at three adjustable pivot points defining a triangle, by means of blind side adjustment screws 12, 13, and 14. Thus, the orientation of mirror 4 relative to adjustable support 21 can be initially adjusted by properly adjusting screws 12, 13, and 14, as subsequently explained. Similarly, lower mirror hanger assembly 23 is supported by three adjustment screws 15, 16, and 17 to adjustable frame 21, so the relative orientation of standard mirror 3 also can be independently initially adjusted, as subsequently explained.

Figure 4:
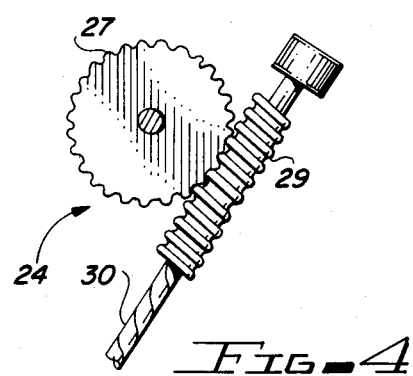
FIG. 4 is a section view taken along section line 4—4 of FIG. 3.
Figure 5:
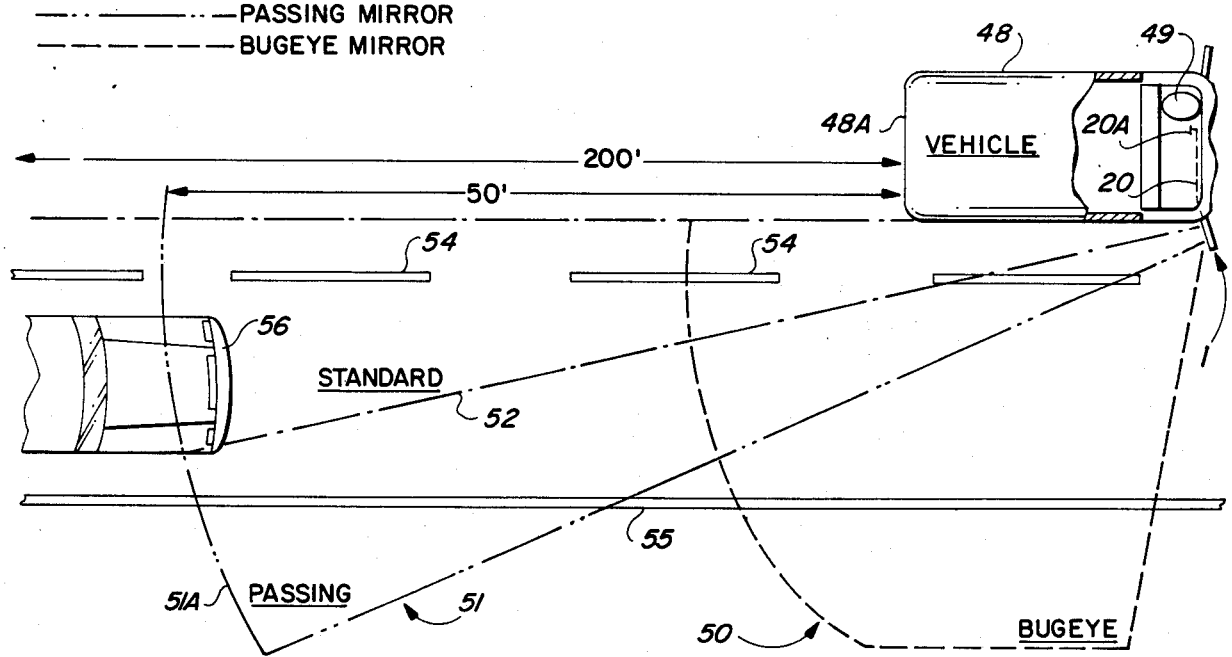
FIG. 5 is a diagram useful in explaining the operation of the rearview mirror assembly of FIG. 1.

The details of adjustable spacer assemblies 24 and 31 are best seen with reference to FIGS. 3 and 4. Adjustable spacer assembly 24 is attached by means of a flexible cable core 30 through a cable housing 20 to a control 20A (FIG. 5) near the driver's seat that allows the upper support point of adjustable support 21 to be adjusted from the driver's seat. A screw gear 29 is turned with cable core 30, causing gear 27 to rotate, turning screw shaft 26. Screw shaft 26 turns in threaded nut block 25, which is rigidly attached to the back surface of adjustable support 21. The axle of gear 27 is journaled in a bearing 28 that is rigidly attached to the back 2A of housing 2. Similarly, lower adjustable support 31 includes a screw gear 35 connected to a rotary cable core 36 that also extends through cable housing 20 to the driver control 20A. Rotation of screw gear 35 turns sprocket gear 34, which is rotatably supported by its axle in stationary bearing 37, which is attached to back wall 2A. Threaded screw rod 33 is attached to sprocket gear 34 and passes through threaded nut block 32, which is rigidily attached to the lower left-hand corner of adjustable support 21. Since the lower right-hand corner of adjustable support 21 is pivotally connected in fixed relationship to the back wall 2A, continuous, precise adjustment of the orientation of adjustable support 21 is achieved from the control 20A (FIG. 5).

Mirror hangers 22 and 23 can be continuously, precisely adjusted by means of the adjustment screws 12, 13, and 14, and 15, 16, and 17, respectively. For example, adjustment screw 12 supports the upper center portion of upper mirror hanger 22 and extends through nut block 41, which is rigidly attached to the upper center portion of adjustable support 21. A compression spring 41A urges upper mirror hanger 22 outward against the head of screw 12. Similarly, adjustment screws 13 and 14 adjustably connect the lower left and right-hand corners of mirror hanger assembly 22 to adjustable frame 21. Similarly, three points of lower mirror hanger assembly 23 are connected in adjustable spaced relationship to adjustable support 21 by means of adjustment screws 15, 16, and 17, each of which extends through a rigid nut block, such as 42 and 43, attached to adjustable frame 21.

FIG. 4 shows the structure of adjustment mechanism 24 in somewhat more detail than FIG. 3.

It should be noted that the upper mirror hanger assembly 22 and lower mirror hanger assembly 23 need not be triangular, as shown in FIG. 2, but can have any shape that is convenient for attachment of upper mirror 4 and lower mirror 3 respectively thereto. Although optional, it is usually convenient to attach a "bugeye" mirror to the inner or left-hand lower portion of lower mirror 3. Bugeye mirrors are widely used by truckers, who adhesively attach them to a portion of the plane surface of their main outside rearview mirrors to allow them to see along-side vehicles. Since ordinarily the image of an along-side vehicle only appears in the outer lower right-hand quadrant of a bugeye mirror attached to a right-hand outside mirror, a portion of a bugeye or semi-spherical mirror such as 9 can be provided, as shown in FIG. 1. Alternately, a round semi-spherical bugeye mirror could be adhesively attached to the lower left surface of lower mirror 3.

In accordance with the described embodiment of the present invention, standard mirror 3 has an etched or otherwise permanently provided cross or indicia 8 disposed in its lower right-hand corner to facilitate initial adjustment of standard mirror 3.

Also in accordance with the present invention, an alignment cross 7 is etched or otherwise provided in the upper left-hand corner of blind side mirror 4. Although there are numerous ways of aligning standard mirror 3 and blind side mirror 4 to accomplish the objective of making it easy for the driver of the passing vehicle to determine when the passing vehicle is sufficiently far ahead of the vehicle being passed to safely pull into the lane in front of the passed vehicle, the following is one practical way of achieving the desired alignment. (The vehicle to which the mirror assembly is attached is called herein the "passing vehicle", and the vehicle being passed is called the "passed vehicle".)

To align the mirrors, the passing vehicle can be taken to a suitable parking lot having a long straight painted white line therein. The passing vehicle is positioned approximately three feet to the left of the painted line, as this corresponds to the typical location of a passing vehicle relative to a center line of a highway when it is passing another vehicle. A second vehicle can be driven to a distance of 50 feet behind the passing vehicle, but to the right of the painted line by about three feet. The frame 2 is initially roughly adjusted so that there is sufficient freedom of movement of the movable frames 5 and 6 within main frame 2 to make the additional adjustments that are needed. Then, screws 15, 16, and 17 are adjusted until the etched cross 8 of standard mirror 3 is aligned with the left-hand headlight of the second vehicle, as seen by the driver seated in the driver's seat of the passing vehicle 48 (FIG. 5). Next, adjustment screws 12, 13, and 14 are adjusted to align the image of the etched cross 7 in blind side mirror 4, as seen by the driver seated in the driver's seat 49 of the passing vehicle 48 (FIG. 5) with the same headlight of the second vehicle.

Figure 6A:
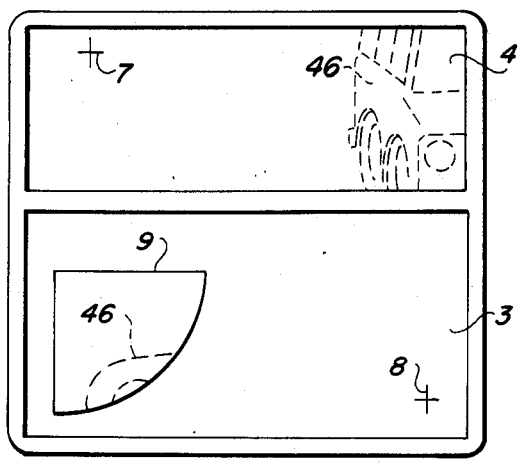
FIGS. 6A–6C show a succession of images of a vehicle being passed in the rearview mirror assembly of FIG. 1.
Figure 6B:
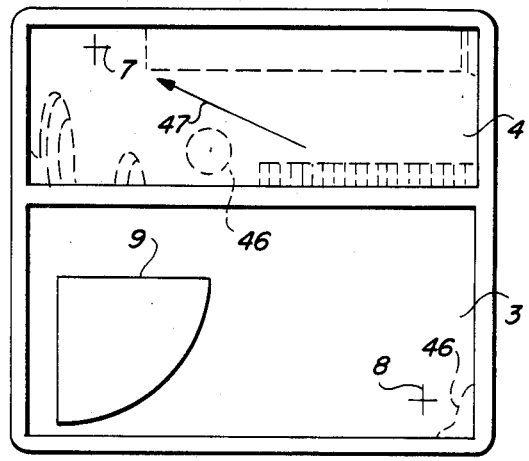
Figure 6C:
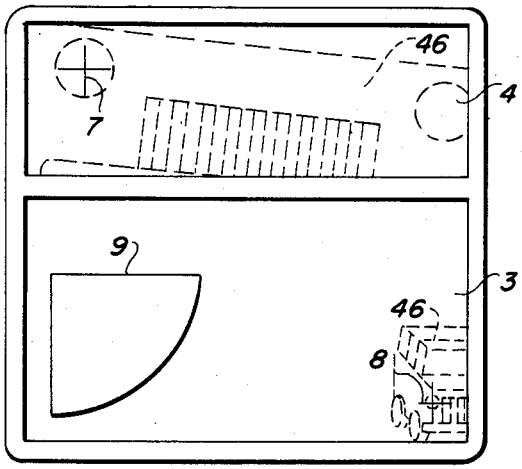

Then, in a situation in which the passing vehicle 48, with its mirror assembly properly adjusted, is passing another car, designated by dotted lines 46 in FIGS. 6A-6C, a portion of the passed car 46 typically will appear to the driver of the passing vehicle 48 in bugeye mirror 9, as shown in FIGS. 6A, when the passed car 46 is along side of the passing vehicle 48. By about the time the front end of the passed car 46 is at the rear bumper of the passing vehicle 48 (depending, of course, on the length of the passing vehicle 48), a portion of the left side of the passed vehicle 48 will begin to appear at the lower right corner of blind side mirror 4, as also indicated by reference numeral 46 in FIG. 6A. At this point, none of the passed car 46 will appear in standard mirror 3. As the passing vehicle 48 moves further ahead of the passed vehicle 46, the image of the passed vehicle 46 tends to move diagonally upward and to the left toward the upper left-hand corner of blind side mirror 4 in the general direction of arrow 47, as indicated in FIG. 6B.

By the time the rear end of the passing vehicle 48 is about 25 feet ahead of the front of the passed vehicle 48, the left side of the passed vehicle 46 will begin to appear in the right side of standard mirror 3, as shown in FIG. 6B.

By the time the left headlight of the passed vehicle 46 is aligned with etched cross 7 in blind side mirror 4, both of the headlights of the passed car will have just become visible in blind side mirror 4, and the rear end of the passing vehicle 48 typically is about 50 feet (or some other preselected distance) ahead of the front end of the passed vehicle 46. At this point, the image of the left headlight of the passed car 46, as seen by the driver of the passing vehicle also is aligned with cross 8 of standard mirror 4. At this point, the driver of the passing vehicle knows that it is safe to pull into the lane ahead of passed vehicle 46. Afterwards, as the distance between the passed vehicle and the passing vehicle increases, the image of the passed vehicle 46 will move fully into standard mirror 3 so that the driver of the passing vehicle can keep his eye on the vehicle behind him if desirable.

Alternately, the blind side mirror 4 could be initially adjusted such that as soon as the headlights of the passed vehicle 46 move upward out of the field of view of blind side mirror 4, the driver of the passing vehicle 48 knows that it is safe to pull into the lane ahead of the passed vehicle 46.

Of course, a portable alignment marker such as a cross positioned at a height equal to the height of the headlights of an ordinary car, can be positioned at the preselected safe distance behind the passing vehicle 48 and can be used to align the etched crosses 7 and 8 with the alignment cross, if desired, instead of actually using the headlights of another car to align the mirror 3 and 4.

At this point, to more completely understand what is seen by the driver of the passing vehicle in the mirror assembly 1 of the present invention, it will be helpful to refer to FIG. 5. In FIG. 5, dotted line 50 generally designates the functional field of view of bugeye mirror 9, as seen by the driver of vehicle 48. Reference numeral 54 designates the safety markers or center line of the highway dividing the passing lane from the driving lane. Reference numeral 56 designates the passed vehicle in the driving lane and reference numeral 55 designates the right-hand boundary of the driving lane. The driver can see the passed vehicle 56 along side of the passing vehicle 48, but nearly loses sight of the passed vehicle 56 in bugeye mirror 9 when the passed vehicle 56 is more than about 15 to 20 feet behind the passing vehicle 48. Dashed line 51 generally designates the field of view of properly adjusted blind side mirror 4. Portion 51A of dashed line 51 designates approximately the point at which the headlights of the passed vehicle 46 move upward out of the field of vision of blind side mirror 4. Dashed line 52 designates a boundary of the field of view of standard mirror 3, which, when properly adjusted, makes the entire rearward section of highway visible to the driver as far as his eye can see.

Generally, the driver of the passing vehicle 48 can easily recognize that when he sees both headlights of the passed vehicle 56 in the bugeye mirror, it means that the passed vehicle 56 is along side of the passing vehicle 48. Then, when both headlights of the passed vehicle 56 become visible in the blind side mirror 4, this means that the headlights of the passed vehicle 56 are about 50 feet (or other preselected distance) behind the passing vehicle 48. Finally, when the driver sees both headlights of the passed vehicle 56 in the main mirror 3, it means that the passed vehicle 56 is more than 50 feet (or other preselected distance) behind the passing vehicle 48.

The above-described mirror assembly thus allows "headlight-counting" as a safe and convenient method for the driver of the passing vehicle to determine when it is safe to pull back in front of the passed vehicle.

Alternatively, the etched crosses can be placed somewhat differently than indicated in the drawings herein during initial adjustment of blind side mirror 4. For example, the etched cross 7 can be positioned so that the images of the two headlights of the passed vehicle, as seen by the driver of the vehicle, "straddle" the etched cross 7 when blind side mirror 4 is properly adjusted and the passed vehicle is at the predetermined safe distance behind the passing vehicle (and, of course, any trailer towed by the passing vehicle).

As yet another practical alternative, blind side mirror 4 can be adjusted so that one or both of the headlights of the passed vehicle are in view (to the driver) in blind side mirror only when the passing vehicle attains the predetermined safe distance in front of the passed vehicle.

In any event, the above-described mirror assembly enables the driver of the passing vehicle to make rapid, more precise, and safer vehicle passing maneuvers than any prior rearview mirror assembly. The mirror assembly 1 is fully adjustable to any preset distance behind the vehicle. Since the system of the present invention is based on triangulation, the higher the mirror assembly is attached in the passing vehicle, the more precise the determination that the passing vehicle is a safe distance ahead of the passed vehicle when the headlights of the passed vehicle are aligned with the appropriate indicia of the blind side mirror. This should be of great value to the drivers of motorhomes, vans, trucks, and vehicles towing long trailers, especially narrow trailers that are "hidden" from the driver's field of view in his rear view mirrors. The amount of time expended by the driver of such passing vehicles in looking in their rearview mirrors trying to judge when it is safe to pull back in front of the passed vehicle will be greatly reduced, allowing the driver of the passing vehicle to spend more time looking forward to the road ahead, thereby increasing the safety of everyone concerned.

After the initial adjustments of standard mirror 3 and blind side mirror 4 have been made, than a different driver of the passing vehicle who is of different height and who therefore must adjust the seat position accordingly, can simply manipulate the cable controls 20A to cause adjustment of adjustable support 21 so that the new driver can see the usual rear highway view in standard mirror 3. Blind side mirror 4 then will already be properly adjusted for the preselected "safe" distance so that the new driver of the passing vehicle can know, by quick observation of the location of the position of the image of the headlights of a passed vehicle in blind side mirror 4, when it is safe to pull back in front of the passed vehicle.

Preferably, any person driving the passing vehicle should be fully apprised, for example, by printed easily readable instructions adhesively attached to the dashboard of the passing vehicle, how to interpret the view of the passed vehicle seen in blind side mirror 4 so that a safe passing maneuver can be performed.

While the invention has been described with reference to a particular embodiment thereof, those skilled in the art will be able to make various modifications to the described embodiment without departing from the true spirit and scope of the invention. It is intended that all elements and/or steps of various embodiments of the invention which perform substantially the same function in substantially the same way to achieve substantially the same result are within the scope of the present invention. For example, it is not essential that remote adjustment of support 21 be provided, or even that support 21 be adjustable at all. What is of greatest importance is the fact that both standard mirror 3 and blind side mirror 4 can be adjusted so that the above-described images appear to the driver of the passing vehicle so that the driver can readily determine, by noting the position of the headlights of the passed vehicle as they either appear or disappear from the blind side mirror, when it is safe to pull back in front of the passed vehicle.

The basic principles of the invention apply to a blind side mirror 4 regardless of whether it is mounted on the outside of the right-hand door or on the outside of the left-hand door of the passing vehicle, or inside the passing vehicle in the usual centered location of an inside mounted rearview mirror. If the blind side mirror is located inside the passing vehicle, the field of view in such blind side mirror wil be restricted, but in many vehicles it nevertheless will be possible for the driver to determine when it is safe to pull back in front of the passed vehicle by determining when the images of the headlights of the passed vehicle appear in a predetermined portion of such blind side mirror. In its broadest aspect, the blind side mirror of the present invention can be a "stand-alone" mirror that is not part of an assembly that includes a main mirror or a bugeye mirror, provided that such stand-along mirror is preadjusted so that the headlights of the passed vehicle come into view of the driver of the passing vehicle only when the passing vehicle is sufficiently far ahead of the passed vehicle that it is safe for the passing vehicle to pull back into the driving lane ahead of the passed vehicle.

Other techniques for properly aligning the blind side mirror 4 than those described above can be envisioned. For example, a second set of indicia can be provided on the blind side mirror in the form of a straight line that is aligned with the center safety stripes 54 (FIG. 5) when the passing vehicle 48 is in the passing lane and the indicia 7 is aligned with the left headlight of the passed vehicle 56 when the passed vehicle is the preselected distance behind the passing vehicle as illustrated in Fig. 5.

In some instances, it might be convenient to provide an indicator or scale that indicates the relative position of the blind side mirror 4 relative to the position of the main mirror 3 to make it easy for the user to establish an initial approximate orientation of the blind side mirror once the main mirror is adjusted to suit the driver. Adjustment of the blind side mirror then could be more conveniently accomplished. An alternate embodiment of the invention that might be useful in some instances would be the provision of a horizontally elongated main rearview mirror of the type typically mounted adjacent to the center upper portion of the windshield of the passing vehicle, modified so that a first portion of the mirror surface is used in the normal fashion to enable the driver to view the distant rearward highway, and an adjacent second portion of the mirror surface is oriented slightly downward and outwardly to the right relative to the first portion, so that one headlight or both headlights of a passed vehicle come into view in the second adjacent portion or become aligned with an indicia of the adjacent second portion when the passing vehicle is a predetermined distance ahead of the passed vehicle.

What is claimed is:

1. A rearview mirror assembly for attachment to a passing vehicle, the rearview mirror assembly comprising in combination:
    (a) a first plane mirror;
    (b) first supporting means for supporting the first plane mirror in an orientation rearward and outward relative to the passenger side of the passing vehicle such that an image of the headlights of a passed vehicle is reflected to the eye of a driver of the passing vehicle and appears to the driver to move diagonally across the first plane mirror, and to attain a predetermined relationship with the first plane mirror only when the passing vehicle is a predetermined distance ahead of the passed vehicle, and when the passed vehicle is in a driving lane of a road and the passing vehicle is in a passing lane adjacent to the driving lane;
    (c) a second plane mirror and second supporting means for supporting the second plane mirror to reflect an image of a distant rearward portion of the driving lane behind the passing vehicle to the driver of the passing vehicle;
    (d) unitary supporting means for supporting the first and second supporting means outside of the passing vehicle on a passenger side of the passing vehicle, reltive to the unitary supporting means; and
    (e) adjustment means in each of the first and second supporting means, respectively, for effectuating individual adjustment of the first and second plane mirrors, respectively.

2. The rearview mirror assembly of claim 1 wherein the predetermined relationship is that the image of the headlights of the passed vehicle, as seen by the driver of the passing vehicle, appears to move from a reflecting surface of the first plane mirror to a location above an upper edge of the first plane mirror as the passing vehicle exceeds the predetermined distance ahead of the passed vehicle.

3. The rearview mirror assembly of claim 1 wherein the first plane mirror includes a first indicia disposed on a predetermined location of the reflecting surface of the first plane mirror, and wherein the image of the headlights of the passed vehicle appears to a driver of the passing vehicle to move into a predetermined relationship to the first indicia only as the passsing vehicle attains the predetermined distance ahead of the passed vehicle.

4. The rearview mirror assembly of claim 1 further including remote adjusting means connected between the adjustment means of the first supporting means and the adjustment means of the second supporting means, and a control adjustable by the driver in the driver's seat of the passing vehicle to enable the driver to adjust the orientation of the unitary supporting means so that the first plane mirror is properly adjusted when the second plane mirror brings the image of the distant rearward portion of the first lane to the driver's eye.

5. The rearview mirror assembly of claim 1 including a bugeye mirror attached in fixed relationship to the second plane mirror to reflect an image of the passed vehicle to the driver when the passed vehicle is along side of the passing vehicle.

6. The rearview mirror assembly of claim 1 wherein the predetermined relationship is that the image including both headlights of the passed vehicle come into view of the driver of the passing veicle so that the image of one of the headlights of the passed vehicle appears adjacent to one edge of the first plane mirror and the image of the other headlight of the passed vehicle appears adjacent to an opposite edge of the first plane mirror as the passing vehicle exceeds the predetermined distance ahead of the passed vehicle.

7. A method of using a mirror assembly attached to a first vehicle to accomplish safe passing of a second vehicle by the first vehicle, the method comprising the steps of:
(a) providing a first plane mirror attached to a first vehicle and a second plane mirror both attached to the outside of a passenger side of the first vehicle;
(b) adjusting the first plane mirror to an orientation such that an image of very distant rearward highway straight behind the first vehicle is reflected to the eye of the driver of the first vehicle, and adjusting the second plane mirror to an orientation rearward and outward relative to the first vehicle such that (1) the image of portions of the rearward highway more distant than a predetermined distance behind the first vehicle are not reflected to the eye of the driver of the first vehicle, and (2) a portion of the image of the rearward highway nearer to the first vehicle than the predetermined distance and located outward relative to the passenger side of the first vehicle is reflected to the eye of the driver of the first vehicle;
(c) driving the first vehicle from a driving lane behind the second vehicle into an adjacent passing lane;
(d) driving the first vehicle in the passing lane past the second vehicle and maintaining the first vehicle in the passing lane until an image of a headlight of the second vehicle as seen by the driver of the first vehicle moves diagonally into a predetermined portion of the second plane mirror; and
(e) driving the first vehicle into the driving lane ahead of the slower second vehicle.

8. The method of claim 7 wherein step (a) includes providing a common frame attached in adjustable relationship to the first vehicle, attaching the first plane mirror in adjustable relationship to the common frame, and attaching the second plane mirror in adjustable relationship to the common frame, and adjusting the common frame so that the first plane mirror is oriented in accordance with the location of the eye of a different driver, whereby the second plane mirror also will be oriented in accordance with the location of the eye of the different driver.

9. The method of claim 7 wherein step (b) includes adjusting the second plane mirror so that the driver of the first vehicle can recognize that the first vehicle is a preselected safe distance ahead of the slower second vehicle as soon as the image of both headlights of the slower second vehicle come into the view of the driver of the first vehicle in the second plane mirror.

10. The method of claim 7 wherein step (b) includes adjusting the second plane mirror so that the driver of the first vehicle can easily determine that the first vehicle is a preselected safe distance ahead on the slower second vehicle as soon as the image of both headlights of the slower second vehicle appear to the driver of the first vehicle to move upward and out of the reflecting surface of the second plane mirror.

* * * * *